United States Patent
Yuan et al.

(10) Patent No.: US 12,227,879 B2
(45) Date of Patent: Feb. 18, 2025

(54) METHOD AND APPARATUS FOR PREPARING MONODOMAIN LIQUID CRYSTAL ELASTOMER SMART FIBER

(71) Applicants: CHANGZHOU UNIVERSITY, Jiangsu (CN); YANGZHOU UNIVERSITY, Jiangsu (CN); YANGZHOU TECHNOLOGY INNOVATION RESEARCH CENTER FOR CARBON NEUTRALITY OF YANGZHOU UNIVERSITY, Jiangsu (CN)

(72) Inventors: Ningyi Yuan, Jiangsu (CN); Xu Dong, Jiangsu (CN); Lvzhou Li, Jiangsu (CN); Jianning Ding, Jiangsu (CN); Xiaoshuang Zhou, Jiangsu (CN); Yaoyao Jiang, Jiangsu (CN)

(73) Assignees: Changzhou University, Changzhou (CN); Yangzhou University, Yangzhou (CN); Yangzhou Technology Innovation Research Center for Carbon Neutrality of Yangzhou University, Yangzhou (CN)

( * ) Notice: Subject to any disclaimer, the term of this patent is extended or adjusted under 35 U.S.C. 154(b) by 72 days.

(21) Appl. No.: 18/220,471

(22) Filed: Jul. 11, 2023

(65) Prior Publication Data
US 2024/0003060 A1    Jan. 4, 2024

Related U.S. Application Data

(63) Continuation of application No. PCT/CN2022/074202, filed on Jan. 27, 2022.

(30) Foreign Application Priority Data

Jan. 17, 2022 (CN) .......................... 202210049200.0

(51) Int. Cl.
B29C 67/00    (2017.01)
B29C 71/04    (2006.01)
(Continued)

(52) U.S. Cl.
CPC ........... *D01D 5/38* (2013.01); *B29D 99/0078* (2013.01); *C09K 19/061* (2013.01); *D01F 1/09* (2013.01);
(Continued)

(58) Field of Classification Search
CPC . B29C 2035/0822; B29C 67/00; B29C 71/04; B29D 99/0078; B29K 2105/0002;
(Continued)

(56) References Cited

U.S. PATENT DOCUMENTS

2006/0057375 A1* 3/2006 Harren ............... D01D 5/00
264/164 X

FOREIGN PATENT DOCUMENTS

CN    106883863 A  *  6/2017  ............ C08F 222/20
CN    110330589 A     10/2019
(Continued)

OTHER PUBLICATIONS

Translation of CN 106883863 A (published on Jun. 23, 2017).*
Translation of CN 113736199 A (published on Dec. 3, 2021).*
Translation of CN 113802209 A (published on Dec. 17, 2021).*

*Primary Examiner* — Leo B Tentoni
(74) *Attorney, Agent, or Firm* — SZDC Law PC

(57) ABSTRACT

A method for preparing a monodomain liquid crystal elastomer smart fiber incudes: during cross-linking process of the liquid crystal elastomer, drawing of liquid crystal elastomer fibers with uniform diameter from a polymer solution when the viscosity of the cross-linked polymer solution increases to a point where filaments can be drawn; heating by an infrared lamp to form filamentous liquid crystal
(Continued)

elastomer fiber; natural air drying to remove excess solvent in the fiber; and stretching and collection of the fiber, followed by placement of the fiber, whereby the monodomain liquid crystal elastomer smart fiber is obtained. The method uses a one-step liquid phase drawing method, which is simple and suitable for large-scale industrial production and enables continuous preparation of high-strength, large-deformation reversible shape memory liquid crystal elastomer fiber with uniform and controllable diameter, breaking through the limitations of the size, strength and driving performance of existing liquid crystal elastomers.

8 Claims, 7 Drawing Sheets

(51) Int. Cl.
| | |
|---|---|
| B29D 99/00 | (2010.01) |
| C09K 19/06 | (2006.01) |
| C09K 19/10 | (2006.01) |
| D01D 5/12 | (2006.01) |
| D01D 5/38 | (2006.01) |
| D01F 1/09 | (2006.01) |
| D01F 1/10 | (2006.01) |
| D01F 6/96 | (2006.01) |
| D06M 10/00 | (2006.01) |
| B29C 35/08 | (2006.01) |
| B29K 105/00 | (2006.01) |
| B29K 507/04 | (2006.01) |
| B29L 31/00 | (2006.01) |
| C09K 19/20 | (2006.01) |
| C09K 19/52 | (2006.01) |

(52) U.S. Cl.
CPC ............... *D01F 1/10* (2013.01); *D01F 6/96* (2013.01); *D06M 10/001* (2013.01); *B29C 2035/0822* (2013.01); *B29K 2105/0002* (2013.01); *B29K 2105/0047* (2013.01); *B29K 2105/0079* (2013.01); *B29K 2507/04* (2013.01); *B29L 2031/731* (2013.01); *C09K 2019/2078* (2013.01); *C09K 2019/521* (2013.01); *D10B 2401/04* (2013.01); *D10B 2401/041* (2013.01); *D10B 2401/046* (2013.01)

(58) Field of Classification Search
CPC .... B29K 2105/0047; B29K 2105/0079; B29K 2507/04; B29K 2995/012; B29L 2031/731; C09K 19/061; C09K 19/10; C09K 2019/2078; C09K 2019/521; D01D 5/12; D01D 5/38; D01F 1/09; D06M 10/001; D10B 2401/04; D10B 2401/041; D10B 2401/046
USPC ....... 264/104, 105, 164, 210.8, 492; 425/66, 425/174.4, 470; 252/299.01, 299.67
See application file for complete search history.

(56) References Cited

FOREIGN PATENT DOCUMENTS

| CN | 113736199 A | * 12/2021 | ............... C08L 33/14 |
|---|---|---|---|
| CN | 113773543 A | 12/2021 | |
| CN | 113802209 A | * 12/2021 | ............... D01D 5/12 |

* cited by examiner

METHOD AND APPARATUS FOR PREPARING MONODOMAIN LIQUID CRYSTAL ELASTOMER SMART FIBER

This application is a Continuation Application of PCT/CN2022/074202, filed on Jan. 27, 2022, which claims priority to Chinese Patent Application No. 202210049200.0, filed on Jan. 17, 2022, which is incorporated by reference for all purposes as if fully set forth herein.

TECHNICAL FIELD

The present invention relates to the technical field of smart fiber preparation, and in particular to a method and apparatus for preparing a monodomain liquid crystal elastomer smart fiber.

BACKGROUND

Monodomain main-chain liquid crystal elastomers (m-LCEs) can undergo reversible shrinking of more than 40% along the macroscopic orientation of the mesogens when heated. At present, the preparation of monodomain liquid crystal elastomer mainly adopts one-step crosslinking method or two-step crosslinking method. The one-step crosslinking method utilizes surface friction, electric field, magnetic field or light to induce the alignment of molten mesogens in the liquid crystal cell, and then induces free radical polymerization by light or heat to form liquid crystal elastomer film samples with centimeter-scale size and micron-scale thickness, making it difficult to achieve large-scale production and application. Moreover, the light- or heat-induced by the one-step crosslinking method also makes the radical polymerization of the liquid crystal ends produce the side-chain liquid crystal structure, it could limit the mechanical properties of the film.

Currently, the "two-step crosslinking method" is widely used to prepare m-LCEs with large stretchability. The method comprises aligning the lightly crosslinked network with excessive mesogens by mechanical stretching, and then using light or heat to induce free radical polymerization of free liquid crystal end groups (acrylate groups) or performing secondary crosslinking to cure the mesogenic units to solidify the alignment of the mesogenic units. The mechanical stretching of the two-step crosslinking method and the fixation of the high elastic deformation of the crosslinked network during solidification of the secondary crosslinking, as well as the side-chain liquid crystal structure produced by the polymerization of liquid crystal end groups will seriously damage the uniformity of the main-chain network, thus affecting its mechanical properties such as tensile modulus at break.

In view of the above-mentioned problems, the inventor actively carried out research and innovation based on the rich practical experience and professional knowledge in the engineering applications of such products for many years, and here proposes a method and apparatus for preparing monodomain liquid crystal elastomer smart fiber to achieve the preparation of monodomain liquid crystal elastomer smart fibers and to improve the mechanical properties of the fibers to make them more practical.

SUMMARY

The technical problem to be solved by the present invention is to provide a method and apparatus for preparing monodomain liquid crystal elastomer smart fiber. In view of the limitations of the size, strength and control of the currently prepared monodomain liquid crystal elastomers, the present invention abandons the curing process of the photoinitiator, and proposes a one-step method of liquid-phase drawing to continuously prepare monodomain liquid crystal elastomer smart fiber with mesogens aligned along the axial direction.

To this end, the present invention proposes a method for preparing a monodomain liquid crystal elastomer smart fiber, comprising: during crosslinking process of the liquid crystal elastomer, drawing of liquid crystal elastomer fibers with uniform diameter from a polymer solution when the viscosity of the cross-linked polymer solution increases to a point where filaments can be drawn; preliminary removal of part of the solvent by irradiation with an infrared lamp to form filamentous liquid crystal elastomer fiber; natural air drying to remove excess solvent in the fiber; and stretching and collection of the fiber, followed by placement of the fiber, whereby the monodomain liquid crystal elastomer smart fiber is obtained.

The principle is that the liquid crystal molecules in the cross-linked network of the liquid crystal elastomer fibers still have a tendency of self-alignment when the distance between them is close enough. In the process of preparing liquid crystal elastomer fibers by the one-step liquid phase drawing method proposed here, the distance between liquid crystal molecules will be shortened with the continuous volatilization of solvent, and the drawing process confers the initial alignment of liquid crystal molecules, so after the solvent is substantively volatilized, the initially aligned liquid crystal molecules will enter the electric dipole moment force range once again. On this basis, a very small load is exerted to guide the stretching of the flexible molecular chain, providing space for the rotation of the mesogens, and finally realizing the spontaneous alignment of the mesogens.

Furthermore, the method for preparing a monodomain liquid crystal elastomer smart fiber comprises the following operation steps:

S1: adding a liquid crystal monomer and a chain extender to a solvent, stirring and mixing the same evenly, adding a catalyst to initiate a polymerization reaction and stirring airtightly until the reaction ends, whereby a prepolymer with uniform molecular chain length is obtained;

S2: adding a crosslinker to the prepolymer obtained in step S1, mixing and stirring the same evenly, adding the catalyst again to initiate the reaction between the prepolymer and the crosslinker, and continuing airtight stirring to obtain a polymer solution;

It should be noted that the catalyst is added again in step S2, rather than that all the catalyst is added in step S1 only, because the catalyst has partially failed in step S1 after long-term stirring. Therefore, it is necessary to add the catalyst in parts, with each addition corresponding to the reaction of the corresponding step.

S3: when the viscosity of the polymer solution obtained in step S2 increases to the point where filaments can be drawn, drawing liquid crystal elastomer fibers with uniform diameter from the polymer solution, heating the fibers by irradiation with an infrared lamp to preliminarily remove part of the solvent, followed by continuous rotation to achieve one-step forming, whereby filamentary liquid crystal elastomer fibers are continuously prepared;

It should be noted that when the prepolymer reaches the state where filaments can be drawn, the molecular weight of the prepolymer increases to about 130000 MP, but there is still a certain fluidity (solution viscosity is about 13.5 Pa·s).

S4: drying the prepared liquid crystal elastomer fibers by natural air to remove the excess solvent in the fiber to promote the accumulation of liquid crystal molecules, and then stretching and collecting the fibers, wherein the stretching rate is 50-90% to guide the stretching of flexible molecular chains to provide space for the rotation of mesogens, followed by placement for 4 days, after which the mesogens complete the spontaneous alignment, whereby the monodomain liquid crystal elastomer smart fiber can be obtained.

It should be noted that in step S4, the prepared liquid crystal elastomer fibers are stretched and collected with a stretching rate of 50-90%. The stretching is performed because it is necessary to exert a very small load on the prepared liquid crystal elastomer fiber to guide the stretching of flexible molecular chains, providing space for the rotation of mesogens, and finally realizing the spontaneous alignment of mesogens. The stretching rate is 50-90%, because when the stretching rate is less than 50%, the stretched liquid crystal elastomer fiber is insufficiently aligned, while when the stretching rate is larger than 90%, the stretched liquid crystal elastomer fiber will shrink to 80% after alignment, and the stretched liquid crystal elastomer fiber will shrink to 80%, resulting in poor stretching effect.

Furthermore, the method for preparing a monodomain liquid crystal elastomer smart fiber comprises the following steps:

S1.1: prior to S2, adding a conductive filler to the prepolymer obtained in step S1, stirring the same airtightly until even mixing is achieved, followed by ultrasonic dispersion.

It should be noted that the order in which the conductive filler is added is important. For conductive polymers, although one-dimensional carbon nanomaterials are ideal conductive polymer additives as their excellent conductivity, high aspect ratio, and self-entanglement properties are conducive to the formation of conductive pathways, their poor solubility is one of the most basic and difficult problems. Here, the conductive filler is especially added after step S1, because the block copolymer prepolymer produced after the crosslinking of the liquid crystal monomer and the chain extender can be used as the dispersant and base material of the conductive filler. The rigid benzene ring structure of the mesogens forms π-π conjugation with CNT. By adjusting the length and flexibility of the molecular chain of the block copolymer, the multidimensional conductive carbon nanomaterials can be effectively entangled to achieve high-concentration semi-encapsulated dispersion. Moreover, by adding conductive fillers to the liquid crystal elastomer smart fiber, the liquid crystal elastomer smart fiber is endowed with electrical conductivity (17.2 S/m) so that the smart fiber can achieve precise and stable contractive actuation under constant current drive.

Further, the liquid crystal monomer is one or more of 2-methyl-1,4-phenylene bis(4-(3-(acryloyloxy)propoxy) benzoate) (RM257), 2-methyl 1,4-phenylene bis(4-((6-(acryloyloxy)hexyl)oxy)benzoate) (RM82) and long linear liquid crystal molecules with acrylate groups as end groups.

It should be noted that RM257, RM82 or long linear liquid crystal molecules with acrylate groups as terminal groups are selected because these liquid crystal molecules can react with sulfydryl groups of chain extender and crosslinker at room temperature with the presence of catalyst to undergo sulfhydryl-ene addition reactions to achieve efficient crosslinking at room temperature.

Further, the chain extender is one or more of ethylene glycol bis(3-mercaptopropionate) (GDMP), 1,4 butanediol bis(mercaptopropionate) (BDBT), ethylene glycol dimercaptoacetate (EGBMA), 3,6-dioxa-1,8-octanedithiol (EDDET), bis(2-mercaptoethyl)ether (DSH), 1,3-propanedithiol (PDT), 1,6-Hexanedithiol (HDT) and 1,10-decanedithiol (DDT).

It should be noted that the above chain extenders are linear flexible chain extenders with two end groups of sulfhydryl, which can form a main chain type liquid crystal elastomer by connecting the chain extender and the liquid crystal monomer end-to-end through thiol-ene addition reaction with the liquid crystal monomer whose end group is an acrylate group.

Further, the molar ratio of the liquid crystal monomer to the chain extender is 1:0.8-0.95.

It should be noted that when the molar ratio of liquid crystal monomer to chain extender is in the range of 1:0.8-0.95, the prepared liquid crystal elastomer has the best mechanical and driving performance. When the addition ratio of the chain extender is less than this range, the driving performance of the liquid crystal elastomer is lowered, which is caused by the high degree of crosslinking of the polymer molecular network, which affects the rotation of the liquid crystal molecules when heated. When the addition ratio of the chain extender is greater than this range, both the mechanical and driving performance of the liquid crystal elastomer is lowered, which is caused by the poor crosslinking degree of the polymer network.

Further, the catalyst is one of di-n-propylamine (DPA) and triethylamine (TEA).

Further, the amount of the catalyst is 0.3-3 wt % of the liquid crystal monomer.

Further, the solvent is one or more of tetrahydrofuran, dichloromethane and chloroform.

It should be noted that tetrahydrofuran, dichloromethane and trichloromethane are especially selected in the present invention. Because the above three solvents can effectively dissolve liquid crystal monomer and have low boiling point, they can quickly volatilize at room temperature, which is conducive to one-step molding and preparation at room temperature.

Further, the amount of the solvent is 200-600 wt % of the liquid crystal monomer.

It should be noted that if the amount of solvent is too small, the liquid crystal monomer cannot be dissolved, and if there is too much solvent, the solvent content in the nascent fibers is high during drawing and molding, resulting in that the strength of the nascent fibers is not enough to support continuous drawing and molding, that is, continuous preparation cannot be realized.

Further, the crosslinker is pentaerythritol tetrakis(3-mercaptopropionate) (PETMP), and the molar ratio of the liquid crystal monomer to the crosslinker is 1:0.025-0.1.

Further, the conductive filler is one or more of carbon nanotubes, carbon black, and graphene.

It should be noted that carbon nanotubes, carbon black, and graphene are effective conductive network doping materials with high modulus that can be stirred for a long time and dispersed, for example by ultrasonic.

An apparatus for preparing a monodomain liquid crystal elastomer smart fiber comprises:

a main frame;

a translation mechanism including a screw drive assembly, the screw drive assembly being installed on the main frame for driving a sample tank to translate in the horizontal direction;

a drawing mechanism including a drawing drum fixed on the main frame through mounting seats on both sides and arranged above the translation path of the sample tank, and a second motor to drive the drawing drum to rotate, wherein the nascent fibers drawn by a drawing head are fixed on the drawing drum which rotates to wind the drawn fibers on the surface thereof;

a collection mechanism including a collection drum also fixed on the main frame through mounting seats on both sides and arranged immediately above the drawing drum, and a third motor to drive the collection drum to rotate, wherein the collection drum rotates to wind the fibers unwound from the drawing drum with tension; and an infrared heating mechanism including a plurality of infrared lamps installed in parallel on the main frame and located on the side of the main frame away from the drawing drum, wherein the infrared lamps are arranged to irradiate and heat the fiber to volatilize the solvent in the fiber for solidification.

Further, the translation mechanism includes a base fixed on the main frame, a screw rod fixed on the base through mounting seats at both ends and arranged in parallel with the drawing drum, a slider installed on the screw rod and provided with a holder for fixing the sample tank and moving with the slider, and a first motor drivingly connected to the screw rod and configured to output power to drive the slider to move laterally through transmission of the screw rod.

Further, the diameter of the drawing drum is 2-10 cm, and the drawing speed is 0.5-5 cm/s.

Further, the pulling head is a metal cylindrical drawing head with an outer diameter of 0.25-1.83 mm and a drawing speed of 0.5-5 cm/s.

Further, the plurality of said infrared lamps is divided into three groups that are arranged in order from top to bottom, wherein the bottom group of infrared lamps is parallel to the drawing drum, the remaining two groups of infrared lamps are respectively installed at a height between the drawing drum and the collection drum, and wherein the set power of each group of the infrared lamps gradually increases as the height increases.

Further, the each group of infrared lamps comprises three infrared lamps of the same power. The power of the bottom group of infrared lamps is 50 W, providing a constant temperature of 30-35° C., the power of the intermediate group of infrared lamps is 100 W, providing a constant temperature of 35-40° C., and the power of the top group of infrared lamps is 120 W, providing a constant temperature of 40-45° C.

An application method of monodomain liquid crystal elastomer smart fiber comprises cutting out a small segment of the monodomain liquid crystal elastomer smart fiber containing a conductive filler, placing the segment in an oven at 130° C. for 30 minutes, and preparing a single electro-bionic tendon.

Further, the electro-bionic tendon is fixed at an upper end thereof and suspended with a weight at lower end thereof to realize the electronically controlled lifting of the weight.

Further, the electro-bionic tendon is fixed on the inner side of a mechanical arm, so as to realize the bending of the mechanical arm.

Further, the two ends of the electro-bionic tendon are respectively fixed on an inner surface of the bending side of a bionic finger when the finger is stretched, so as to realize the bending of the bionic finger.

Further, the electro-bionic tendon is used as a lightweight driving component to control the extension of a bionic wing.

Furthermore, the electro-bionic tendon is fixed on the surface of a space folding device to realize rapid deployment of the space folding device.

Further, the electro-bionic tendon is combined with a one-way bearing such that the electro-bionic tendon is fixed on the outer ring gear of the one-way bearing to provide periodic contraction to realize the continuous rotation of the one-way bearing.

Further, the electro-bionic tendon is used as a temperature sensor, and the resistance of the electro-bionic tendon gradually increases with the gradual increase of the stretch rate; when the length of the electro-bionic tendon is fixed, the electrical resistivity can be reduced with the increase of the ambient temperature.

Further, the electro-bionic tendon can be woven into a textile fabric, such as into the inner side of each finger of a textile glove, such that the palm's own skeleton structure is used as a support and the bionic tendon is used as its driving device, achieving a lightweight auxiliary rehabilitation glove to restore finger function of patients with muscle weakness or injury.

The advantageous effects of the present invention are explained below.

1. For the first time, the present invention proposes to directly and continuously prepare monodomain liquid crystal elastomer smart fibers with mesogens aligned in the axial direction by using a one-step liquid phase drawing method. This method combines chemical spinning and melt pool spinning without spinneret, and utilizes the characteristics of self-alignment of rod-shaped polar liquid crystal molecules when they are closely packed to achieve high-strength, large-deformation reversible shape memory liquid crystal elastomer fiber with uniform and controllable diameter. It abandons the process of free radical polymerization induced by light or heat, greatly reduces the defects of the main chain type LCEs molecular network, and breaks through the defects in terms of the size and mechanical properties of the existing "one-step crosslinking method" and "two-step crosslinking method". The prepared liquid crystal elastomer fiber has achieved 55.6% reversible shrinkage, and its breaking strength has increased by two orders of magnitude.

2. The one-step liquid phase drawing method proposed by the present invention avoids the incompatibility between nano-conductive network doping and photo-curing process in the research of conductive LCEs materials, and endows the liquid crystal elastomer smart fiber with electrical conductivity (17.2 S/m) through the semi-encapsulated combination of block liquid crystal prepolymer and carbon nanotubes. The smart fiber can achieve accurate and stable contractive actuation under constant current drive.

3. The one-step liquid phase drawing method proposed by the present invention is simple and can continuously prepare liquid crystal elastomer smart fibers with uniform and controllable diameter (0.2-0.5 mm), realizing large-scale production. At the same time, the present invention also provides a new solution for the application of the liquid crystal elastomer and the development of the conductive polymer, and opens up new ideas for the research of shape memory smart fibers.

DESCRIPTION OF THE DRAWINGS

In order to more clearly illustrate the embodiments of the present invention or the technical solutions in the prior art, the accompanying drawings to be used in the description of the embodiments or prior art will be briefly described below. It is obvious that the accompanying drawings in the following description are only some of the embodiments recorded in the present invention, and other accompanying drawings can be obtained according to these accompanying drawings without creative work for those of ordinary skill in the art.

Figure 1:
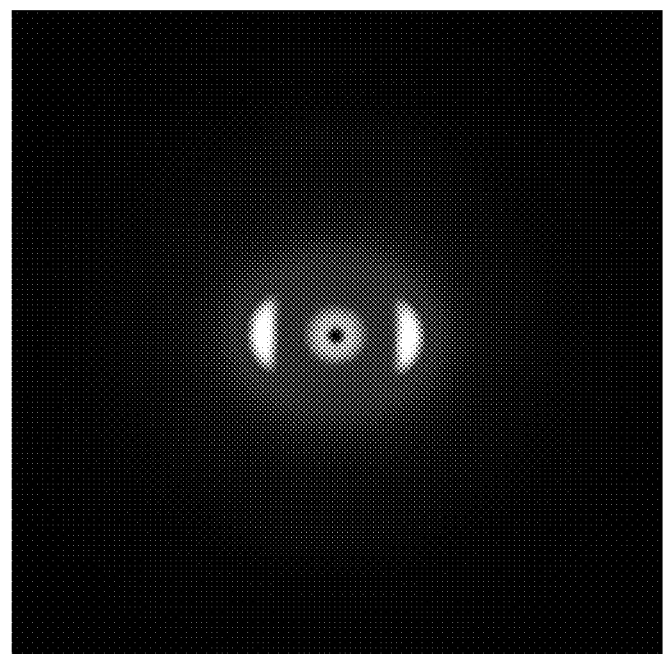
FIG. 1 is a two-dimensional wide-angle X-ray diffraction diagram of the monodomain liquid crystal elastomer smart fiber prepared with EDDET as a chain extender in Example 1 of the present invention.

Reference signs: 1. main frame; 2. sample tank; 3. Drawing drum; 4. second motor; 5. collection drum; 6. third motor; 7. infrared lamp; 8. base; 9. slider; 10. screw rod; 11. first motor.

DESCRIPTION OF THE EMBODIMENTS

The technical solutions in the embodiments of the present invention will be described clearly and completely in conjunction with the accompanying drawings in the embodiments of the present invention. Obviously, the described embodiments are only a part of the embodiments of the present invention, rather than all the embodiments.

It should be noted that when an element is referred to as being "fixed to" another element, it can be directly on the another element or an intermediate element may also be present. It should be noted that when an element is referred to as being "connected to" another element, it can be directly on the another element or an intermediate element may also be present. The terms "vertical," "horizontal," "left," "right," and similar expressions used herein are for illustrative purposes only and do not mean that they are the only mode of implementation.

Unless otherwise defined, all technical and scientific terms used herein have the same meaning as commonly understood by those skilled in the art of the present invention. The terms used herein are for the purpose of describing specific embodiments only and are not intended to limit the invention. The term "and/or" as used herein includes any and all combinations of one or more of the related listed items.

The method for preparing the monodomain liquid crystal elastomer smart fiber according to the present invention will be further described in conjunction with the following examples, but is not limited thereto.

Example 1

Step 1: 3.4 mmol of RM257 and 2.89 mmol of a chain extender were added to 6 ml of tetrahydrofuran solution, stirred for 5 minutes with a magnetic stirrer, then 20 ul of DPA was added dropwise, and reacted for 24 hours under airtight stirring;

Step 2: After the reaction, 0.255 mmol of PETMP was added, stirred airtightly for 20 minutes with a magnetic stirrer, then 20 ul of DPA was added dropwise, followed by airtight stirring for crosslinking;

Step 3: When the molecular weight of the prepolymer increases to about 130,000 MP, but there is still a certain fluidity (solution viscosity is about 13.5 Pa·s), a circular metal drawing head is used to draw monodomain liquid crystal elastomer smart fibers with uniform diameters from the slightly crosslinked polymer solution, wherein the drawing head is fixed on the drawing drum, and the second motor is controlled to rotate at a constant speed of 3 cm/s to realize the continuous preparation of liquid crystal elastomer fiber;

Step 4: The fibers were placed in air at room temperature for 48 hours to remove excess solvent in the fiber, and then stretched and collected with a stretching rate of 80%, followed by placement for 4 days, whereby a roll of high-strength monodomain liquid crystal elastomer smart fiber was obtained.

The specific composition of chain extender in Step 1 is shown in Table 1:

TABLE 1

| No. | 1 | 2 | 3 | 4 | 5 | 6 | 7 | 8 |
|---|---|---|---|---|---|---|---|---|
| Chain extender | GDMP | BDBT | EGBMA | EDDET | DSH | PDT | HDT | DDT |

Example 2

Step 1: 3.4 mmol of RM257 and 2.72 mmol of EDDET were added to 6 ml of tetrahydrofuran solution, stirred for 5 minutes with a magnetic stirrer, then 20 ul of DPA was added dropwise, and reacted for 24 hours under airtight stirring;

Step 2: After the reaction, 0.34 mmol of PETMP was added, stirred airtightly for 20 minutes with a magnetic stirrer, then 20 ul of DPA was added dropwise, followed by airtight stirring for cross-linking;

Step 3: When the molecular weight of the prepolymer increases to about 130,000 MP, but there is still a certain fluidity (solution viscosity is about 13.5 Pa·s), a circular metal drawing head is used to draw monodomain liquid crystal elastomer smart fibers with uniform diameters from the slightly crosslinked polymer solution, wherein the drawing head is fixed on the drawing drum, and the second motor is controlled to rotate at a constant speed of 3 cm/s to realize the continuous preparation of liquid crystal elastomer fiber;

Step 4: The fibers were placed in air at room temperature for 48 hours to remove excess solvent in the fiber, and then stretched and collected with a stretching rate of 80%, followed by placement for 4 days, whereby a roll of monodomain liquid crystal elastomer smart fiber was obtained.

Example 3

Step 1: 3.4 mmol of RM257 and 3.06 mmol of EDDET were added to 6 ml of tetrahydrofuran solution, stirred for 5 minutes with a magnetic stirrer, then 20 ul of DPA was added dropwise, and reacted for 24 hours under airtight stirring;

Step 2: After the reaction, 0.17 mmol of PETMP was added, stirred airtightly for 20 minutes with a magnetic stirrer, then 20 ul of DPA was added dropwise, followed by airtight stirring for crosslinking;

Step 3: When the molecular weight of the prepolymer increases to about 130,000 MP, but there is still a certain fluidity (solution viscosity is about 13.5 Pa·s), a circular metal drawing head is used to draw monodomain liquid crystal elastomer smart fibers with uniform diameters from the slightly crosslinked polymer solution, wherein the drawing head is fixed on the drawing drum, and the second motor is controlled to rotate at a constant speed of 3 cm/s to realize the continuous preparation of liquid crystal elastomer fiber;

Step 4: The fibers were placed in air at room temperature for 48 hours to remove excess solvent in the fiber, and then stretched and collected with a stretching rate of 80%, followed by placement for 4 days, whereby a roll of monodomain liquid crystal elastomer smart fiber was obtained.

Example 4

Step 1: 3.4 mmol of RM257 and 3.23 mmol of EDDET were added to 6 ml of tetrahydrofuran solution, stirred for 5 minutes with a magnetic stirrer, then 20 ul of DPA was added dropwise, and reacted for 24 hours under airtight stirring;

Step 2: After the reaction, 0.085 mmol of PETMP was added, stirred airtightly for 20 minutes with a magnetic stirrer, then 20 ul of DPA was added dropwise, followed by airtight stirring for crosslinking;

Step 3: When the molecular weight of the prepolymer increases to about 130,000 MP, but there is still a certain fluidity (solution viscosity is about 13.5 Pa·s), a circular metal drawing head is used to draw monodomain liquid crystal elastomer smart fibers with uniform diameters from the slightly crosslinked polymer solution, wherein the drawing head is fixed on the drawing drum, and the second motor is controlled to rotate at a constant speed of 3 cm/s to realize the continuous preparation of liquid crystal elastomer fiber;

Step 4: The fibers were placed in air at room temperature for 48 hours to remove excess solvent in the fiber, and then stretched and collected with a stretching rate of 80%, followed by placement for 4 days, whereby a roll of monodomain liquid crystal elastomer smart fiber was obtained.

Example 5

Step 1: 3.4 mmol of RM257 and 2.89 mmol of BDBT were added to 10 ml of tetrahydrofuran solution, stirred for 5 minutes with a magnetic stirrer, then 20 ul of DPA was added dropwise, and reacted for 24 hours under airtight stirring;

Step 2: A conductive filler formed by electrostatic self-assembly of 0.3 g of multi-walled carbon nanotubes and high-conductivity carbon black (mass ratio 4:6) was added to the solution obtained in Step 1, stirred airtightly for 2 hours with a magnetic stirrer, followed by ultrasonic dispersion for 2 hours at an ultrasonic intensity of 0.6 W/cm$^2$.

Step 3: After the ultrasonic dispersion, 0.255 mmol of PETMP was added, stirred airtight for 40 minutes with a magnetic stirrer, then 40 ul of DPA was added dropwise, followed by airtight stirring for crosslinking;

Step 4: When the molecular weight of the prepolymer increases to about 130,000 MP, but there is still a certain fluidity (solution viscosity is about 13.5 Pa·s), a circular metal drawing head is used to draw monodomain liquid crystal elastomer smart fibers with uniform diameters from the slightly crosslinked polymer solution, wherein the drawing head is fixed on the drawing drum, and the second motor is controlled to rotate at a constant speed of 3 cm/s to realize the continuous preparation of liquid crystal elastomer fiber;

Step 5: The fibers prepared in Step 4 were air-dried for 48 hours to remove excess solvent in the fiber, and then stretched and collected with a stretching rate of 50%, followed by placement for 4 days, whereby a roll of monodomain conductive liquid crystal elastomer smart fiber was obtained.

Example 6

Step 1: 3.4 mmol of RM257 and 2.89 mmol of BDBT were added to 10 ml of tetrahydrofuran solution, stirred for 5 minutes with a magnetic stirrer, then 20 ul of DPA was added dropwise, and reacted under airtight stirring for different durations (specifically: 12 hours, 24 hours, 48 hours, 72 hours, 96 hours);

Step 2: The molecular weight of the prepolymer obtained in Step 1 was detected.

Example 7

Step 1: 3.4 mmol of RM257 and 2.89 mmol of BDBT were added to 10 ml of tetrahydrofuran solution, stirred for 5 minutes with a magnetic stirrer, then 20 ul of DPA was added dropwise, and reacted under airtight stirring for different durations (specifically: 12h, 24h, 48h, 72h, 96h);

Step 2: A conductive filler formed by electrostatic self-assembly of a mixture of 0.3 g of multi-walled carbon nanotubes and high-conductivity carbon black (mass ratio 4:6) was added to the solution obtained in Step 1, stirred airtightly for 2 hours with a magnetic stirrer, followed by ultrasonic dispersion for different durations (0 h/0.5 h/1 h/1.5 h/2 h/2.5 h/3 h/4 h) at an ultrasonic intensity of 0.6 W/cm$^2$;

Step 3: A drop of the dispersion solution (about 30 ul) obtained in Step 2 was added to 20 g of THF dropwise, shaken to disperse and then kept still, then optical photos were taken for comparison.

The results show that the prepolymer crosslinking time (molecular chain length) and ultrasonic time can affect the dispersion of CNT/CB. In the case of prepolymer crosslinking for 24 hours, complete dispersion of CNT/CB can be achieved by ultrasonication for 3-4 hours, and there is still no obvious sedimentation after 90 days of storage.

Comparative Example 1

Step 1: 3.4 mmol of RM257, 2.89 mmol of EDDET and 0.02 g of photoinitiator (2,2-dimethoxy-2-phenylacetophenone) were added to 6 ml of tetrahydrofuran solution, stirred for 5 minutes with a magnetic stirrer, then 20 ul of DPA was added dropwise, and reacted for 24 hours under airtight stirring;

Step 2: After the reaction, 0.225 mmol of PETMP was added, stirred airtightly for 20 minutes with a magnetic stirrer, then 20 ul of DPA was added dropwise, followed by airtight stirring for crosslinking, then the solution was poured into a square polytetrafluoroethylene mold with a depth of 1 cm and a width of 6 cm, sealed airtightly for crosslinking for 12 hours;

Step 3: The film prepared in Step 2 was placed in a blast drying oven at 60° C. for 12 hours to prepare the liquid crystal elastomer film.

Comparative Example 2

Step 1: 3.4 mmol of RM257, 2.72 mmol of EDDET and 0.02 g of photoinitiator (2,2-dimethoxy-2-phenylacetophenone) were added to 6 ml of tetrahydrofuran solution, stirred for minutes with a magnetic stirrer, then 20 ul of DPA was added dropwise, and reacted for 24 hours under airtight stirring;

Step 2: After the reaction, 0.17 mmol of a crosslinker (PETMP) was added, stirred airtightly for 20 minutes with a magnetic stirrer, then 20 ul of DPA was added dropwise, followed by airtight stirring for crosslinking, then the solution was poured into a square polytetrafluoroethylene mold with a depth of 1 cm and a width of 6 cm, sealed airtightly for crosslinking for 12 hours;

Step 3: The film prepared in Step 2 was placed in a blast drying oven at 60° C. for 12 hours, taken out and cut into a 0.5 cm*6 cm stripe-like liquid crystal elastomer film, then the film was fixed at both ends with dovetail clips, and stretched so that the length of the film was twice the actual length between the dovetail clips to achieve the alignment of liquid crystal molecules in the film along the stretching direction;

Step 4: The film from Step 3 was placed under UV light (20 mW/cm 2) for 5 min for secondary crosslinking by polymerization of free end groups-acrylate groups of excess liquid crystal to fix the alignment of liquid crystal molecules.

RESULTS AND DISCUSSION: The two-dimensional wide-angle X-ray diffraction diagram of the monodomain liquid crystal elastomer smart fiber prepared with EDDET as a chain extender in Example 1 of the present invention, as demonstrated in FIG. 1, shows that the liquid crystal molecules in the monodomain liquid crystal elastomer smart fiber prepared with EDDET as a chain extender in Example 1 have good orientation.

Figure 2:
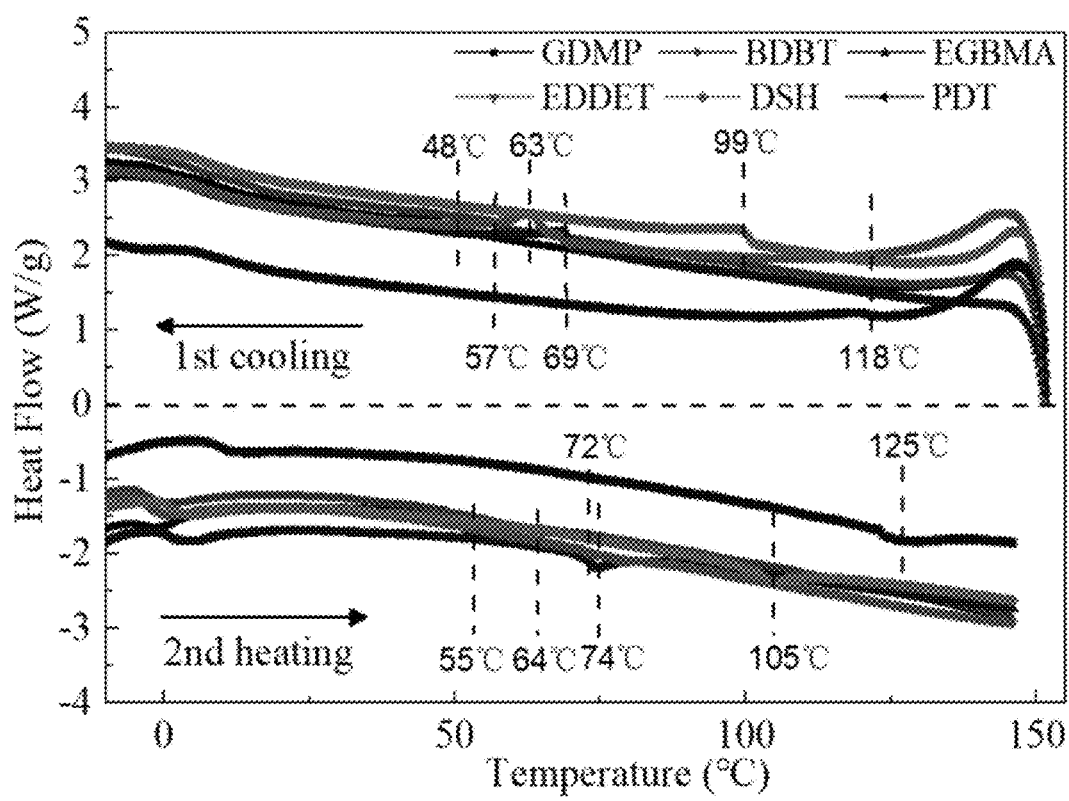
FIG. 2 is a DSC test diagram of the monodomain liquid crystal elastomer smart fiber prepared with GDMP, BDBT, EGBMA, EDDET, DSH and PDT as a chain extender respectively in Example 1 of the present invention.

The DSC test diagram of the monodomain liquid crystal elastomer smart fiber prepared with GDMP, BDBT, EGBMA, EDDET, DSH and PDT as a chain extender respectively in Example 1 of the present invention, as demonstrated in FIG. 2, shows that the liquid crystal order-disorder transition temperature of fibers prepared with different chain extenders is different, specifically, 55° C. (GDMP), 64° C. (BDBT), 74° C. (EGBMA), 73° C. (EDDET), 105° C. (DSH), 125° C. (PDT).

Figure 3:
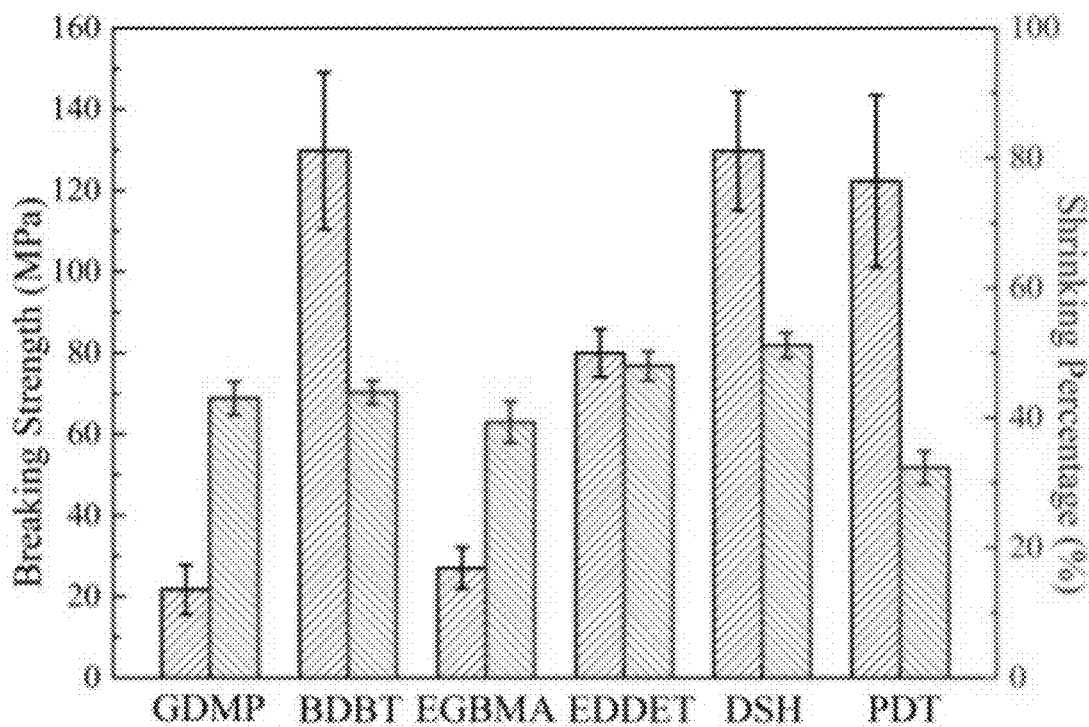
FIG. 3 is a comparison of the reversible shrinkage and breaking strength of the monodomain liquid crystal elastomer smart fiber prepared with GDMP, BDBT, EGBMA, EDDET, DSH and PDT as a chain extender respectively in Example 1 of the present invention.

FIG. 3 is a comparison of the reversible shrinkage and breaking strength of the monodomain liquid crystal elastomer smart fiber prepared with GDMP, BDBT, EGBMA, EDDET, DSH and PDT as a chain extender respectively in Example 1 of the present invention. The data column on the left side of the chart indicates the breaking strength, and the data column on the right side of the chart indicates the reversible shrinkage. The comparison shows that the reversible shrinkage increases with the decrease of the length of the chain extender.

Figure 4:
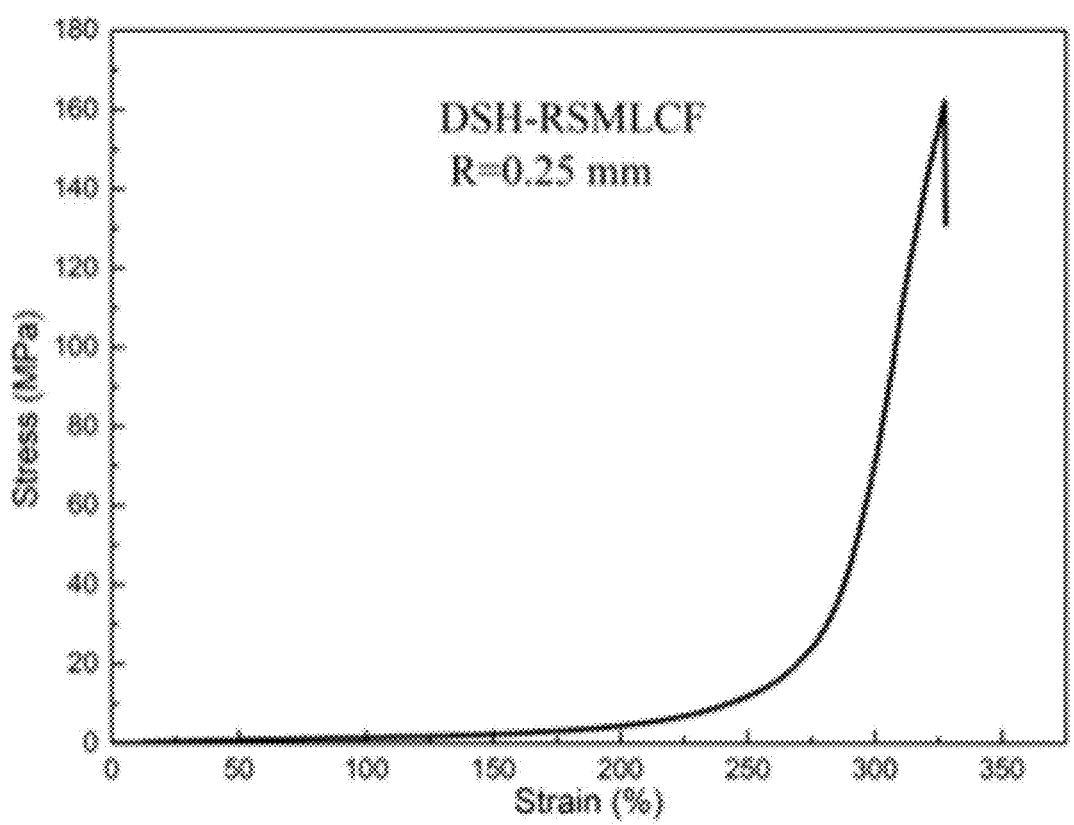
FIG. 4 is a stress-strain diagram of a monodomain liquid crystal elastomer smart fiber prepared with DSH as a chain extender in Example 1 of the present invention.

The stress-strain diagram of a monodomain liquid crystal elastomer smart fiber prepared with DSH as a chain extender in Example 1 of the present invention, as demonstrated in FIG. 4, shows that the breaking strength of the fiber reaches 160 MPa.

Figure 5:
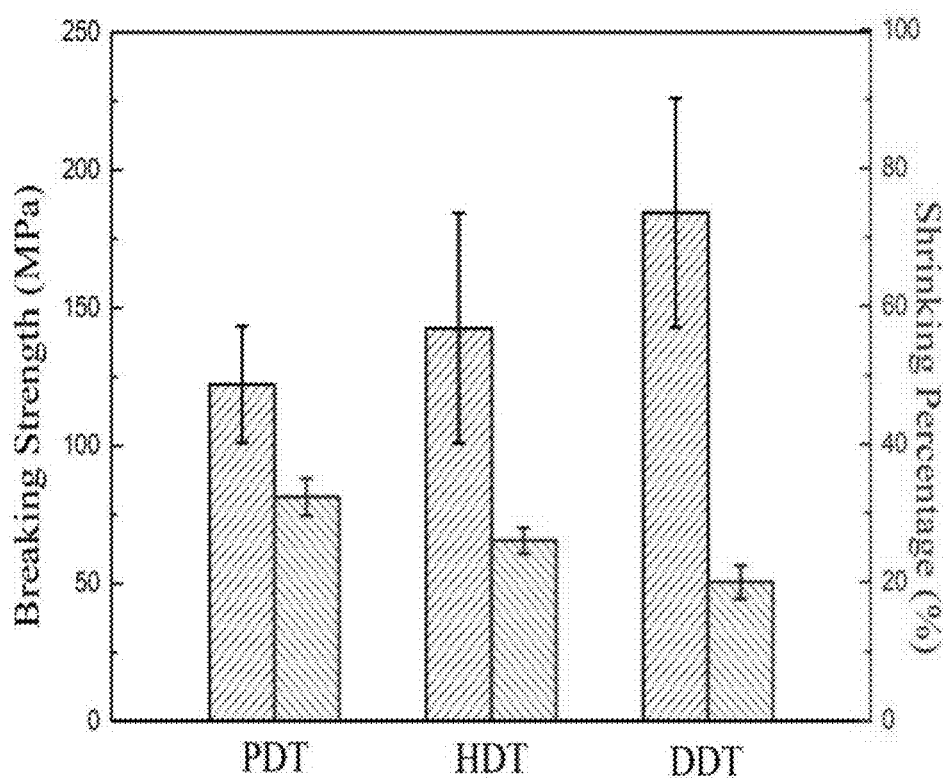
FIG. 5 is a comparison chart of the reversible shape memory properties and breaking strength of the monodomain liquid crystal elastomer smart fiber prepared with PDT, HDT and DDT respectively as a chain extender in Example 1 of the present invention.

FIG. 5 is a comparison chart of the reversible shape memory properties and breaking strength of the monodomain liquid crystal elastomer smart fiber prepared with PDT, HDT and DDT respectively as a chain extender in Example 1 of the present invention. The data column on the left side of the chart indicates the breaking strength, and the data column on the right side of the chart indicates the reversible shrinkage. The comparison shows using long straight-chain alkanedithiol as chain extender results in poor flexibility of the liquid crystal elastomer network, high deformation temperature, and the reversible shrinkage decreased rapidly with the increase of the number of alkyl groups.

Figure 6:
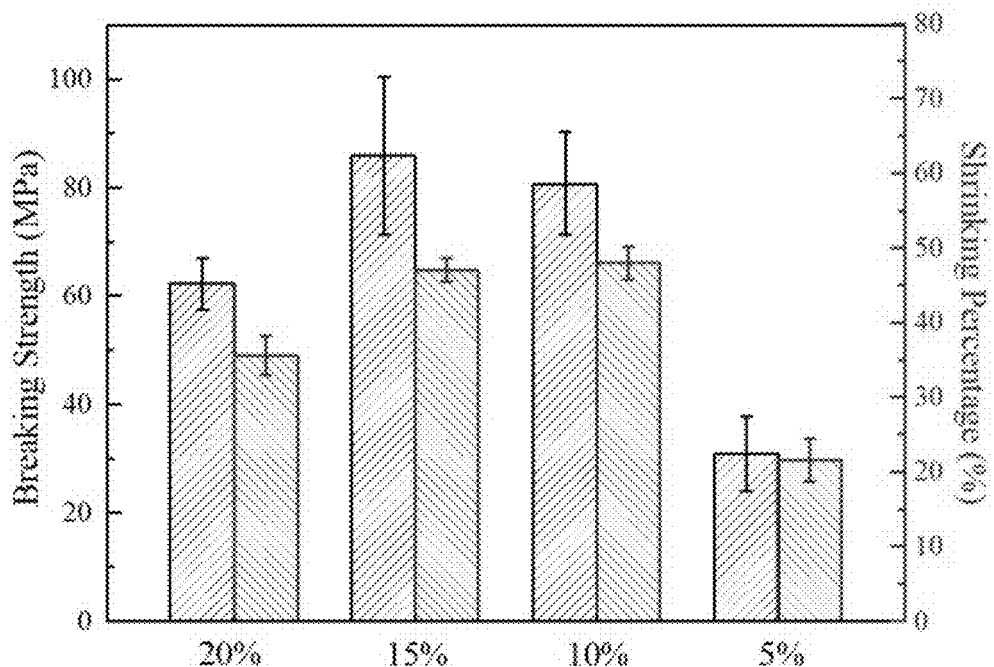
FIG. 6 is a comparison of reversible shape shrinkage and breaking strength of the monodomain liquid crystal elastomer smart fiber with different crosslinker contents in Examples 1, 2, 3 and 4 of the present invention.

FIG. 6 is a comparison of reversible shrinkage and breaking strength of the monodomain liquid crystal elastomer smart fiber with different crosslinker contents in Examples 1, 2, 3 and 4 of the present invention. The data column on the left side of the chart indicates the breaking strength, and the data column on the right side of the chart indicates the reversible shrinkage. The comparison shows that when the crosslinker content is 15%, the reversible shrinkage and the breaking strength are both the best.

Figure 7:
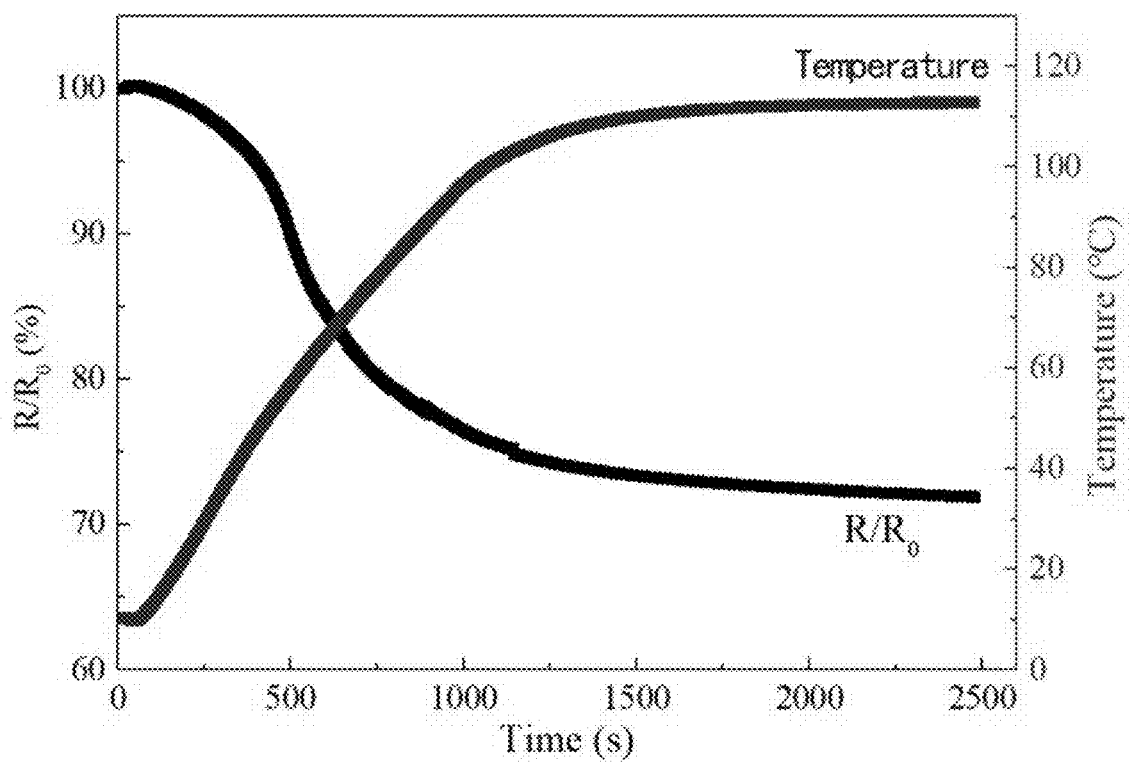
FIG. 7 is a diagram of the change in fiber resistance of the monodomain conductive liquid crystal elastomer smart fiber prepared by doping carbon nanotubes/carbon black in Example 5 of the present invention when the ambient temperature rises from 0° C. to 100° C.
Figure 8:
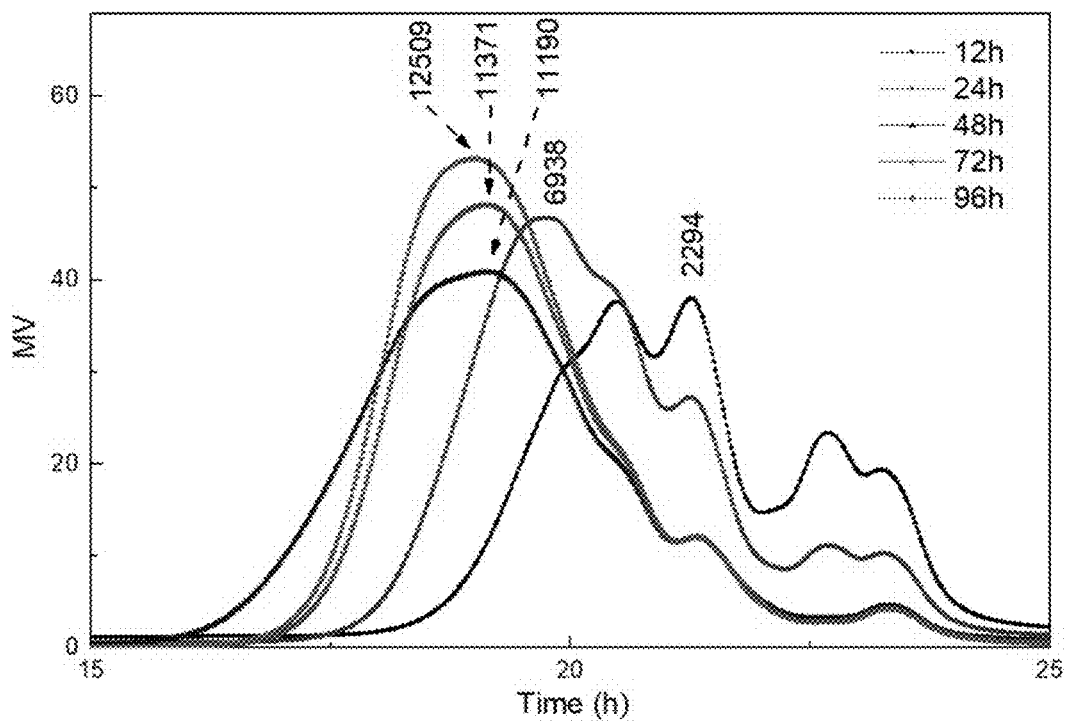
FIG. 8 is a diagram of the change in the molecular weight of the prepared prepolymer along with the prolongation of reaction time in Example 6 of the present invention.

The diagram of the change in fiber resistance of the monodomain conductive liquid crystal elastomer smart fiber prepared by doping carbon nanotubes/carbon black in Example 5 of the present invention when the ambient temperature rises from 0° C. to 100° C., as demonstrated in FIG. 7, shows that there is a positive correlation between ambient temperature and resistance, that is, the resistance increases as the ambient temperature increases. This correlation enables the fiber to be sued as a temperature sensor. Although adding conductive fillers to the monodomain liquid crystal elastomer smart fiber can increase the conductivity of the smart fiber, it will also reduce the reversible shrinkage and breaking strength of the smart fiber.

Figure 9:
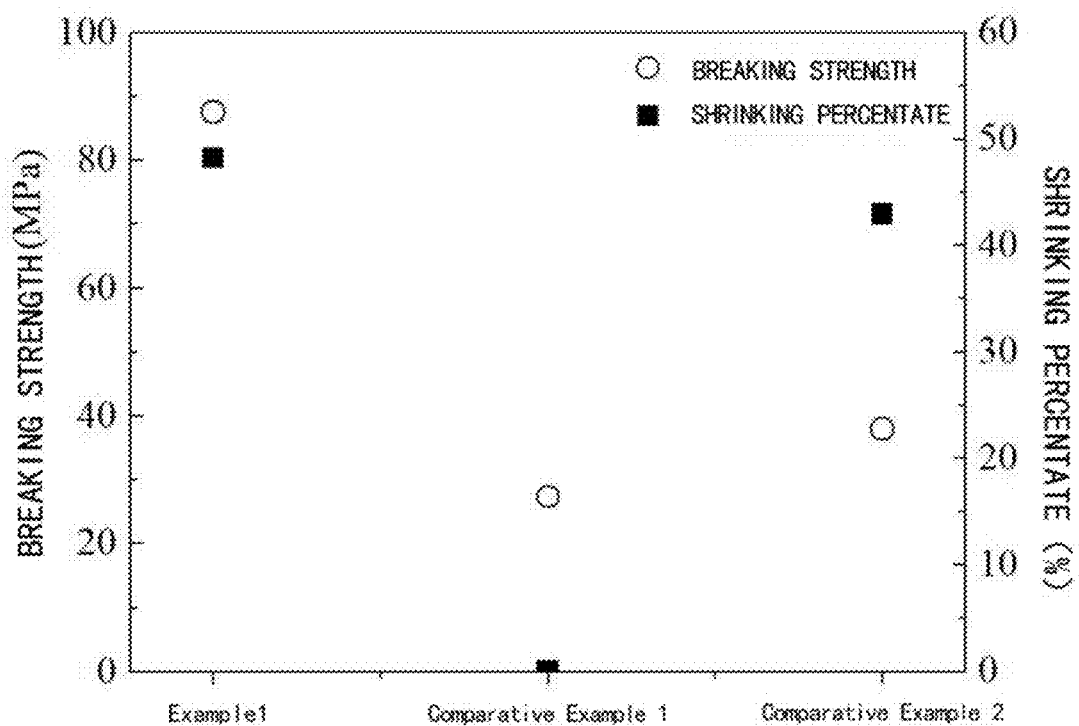
FIG. 9 is a comparison of the reversible shrinkage and breaking strength between the monodomain liquid crystal elastomer smart fiber prepared with EDDET as a chain extender in Example 1 and the film prepared in Comparative Examples 1 and 2 of the present invention.

The comparison of the reversible shrinkage and breaking strength between the monodomain liquid crystal elastomer smart fiber prepared with EDDET as a chain extender in Example 1 and the film prepared in Comparative Examples 1 and 2 of the present invention, as demonstrated in FIG. 9, shows that the reversible shrinkage and breaking strength of the monodomain liquid crystal elastomer smart fiber prepared by the one-step method of liquid-phase drawing according to the present invention are far higher than the film prepared by the commonly used two-step crosslinking method.

Figure 10:
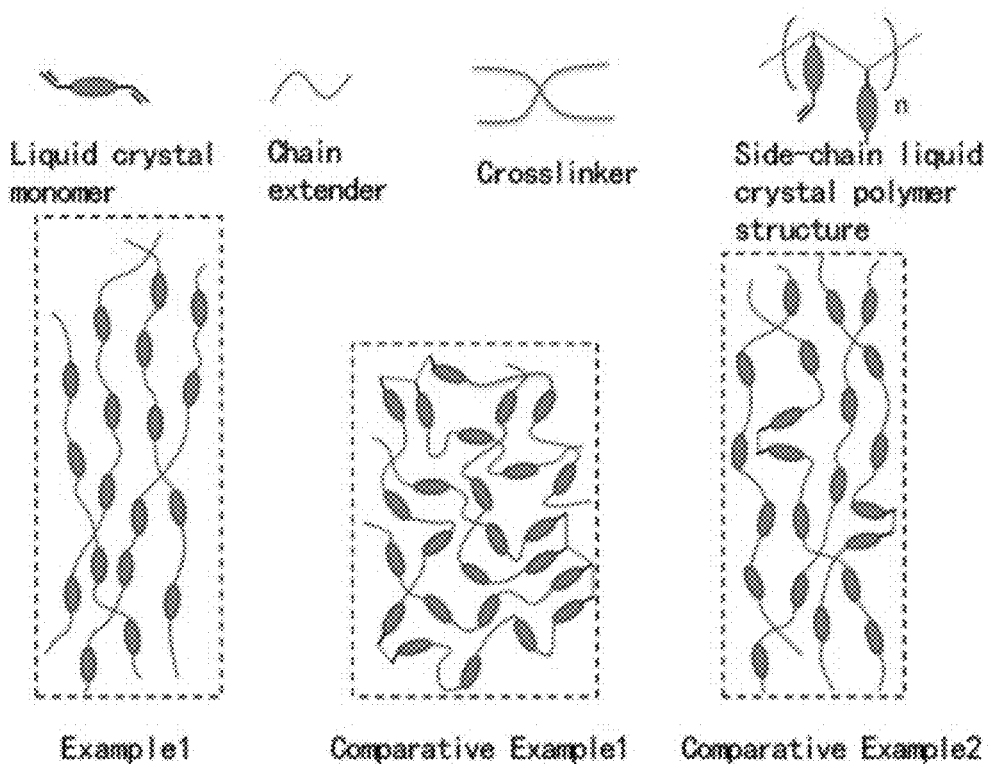
FIG. 10 is a schematic diagram of the molecular connection of the monodomain liquid crystal elastomer smart fiber prepared with EDDET as a chain extender in Example 1 and the film prepared in Comparative Examples 1 and 2 of the present invention.

The schematic diagram of the molecular connection of the monodomain liquid crystal elastomer smart fiber prepared with EDDET as a chain extender in Example 1 and the film prepared in Comparative Examples 1 and 2 of the present invention, as demonstrated in FIG. 10, shows that the mesogens in the monodomain liquid crystal elastomer smart fiber prepared by the one-step method of liquid-phase drawing according to the present invention have a single orientation and can be aligned along the axial direction, while the connections of the mesogens in the film prepared by the two-step crosslinking method are disordered, resulting in the reduction of tensile strength.

In summary, this disclosure abandons the light/thermal curing process, and proposes a one-step liquid phase drawing method to directly and continuously prepare monodomain liquid crystal elastomer smart fiber with mesogens aligned along the axial direction. This method innovatively uses the characteristics of self-alignment of rod-shaped polar liquid crystal molecules when they are closely packed to achieve high-strength, large-deformation reversible shape memory liquid crystal elastomer fiber with uniform and controllable diameter. The driving stress reaches 5.35 MPa, breaking through the limitations of the size, strength and driving performance of existing liquid crystal elastomers.

When the molar ratio of liquid crystal monomer: chain extender: crosslinker is 1:0.85:0.075, the high-strength monodomain liquid crystal elastomer has the best mechanical properties and good reversible driving performance. Although the addition of conductive fillers reduces the strength, it can increase the conductivity of smart fibers. The prepared liquid crystal elastomer smart fibers are similar to biological muscle fibers, can be driven precisely and controllably, and are easy to integrate, and have broad application prospects in the fields of artificial muscles, soft robots and micromechanical systems.

Figure 11:
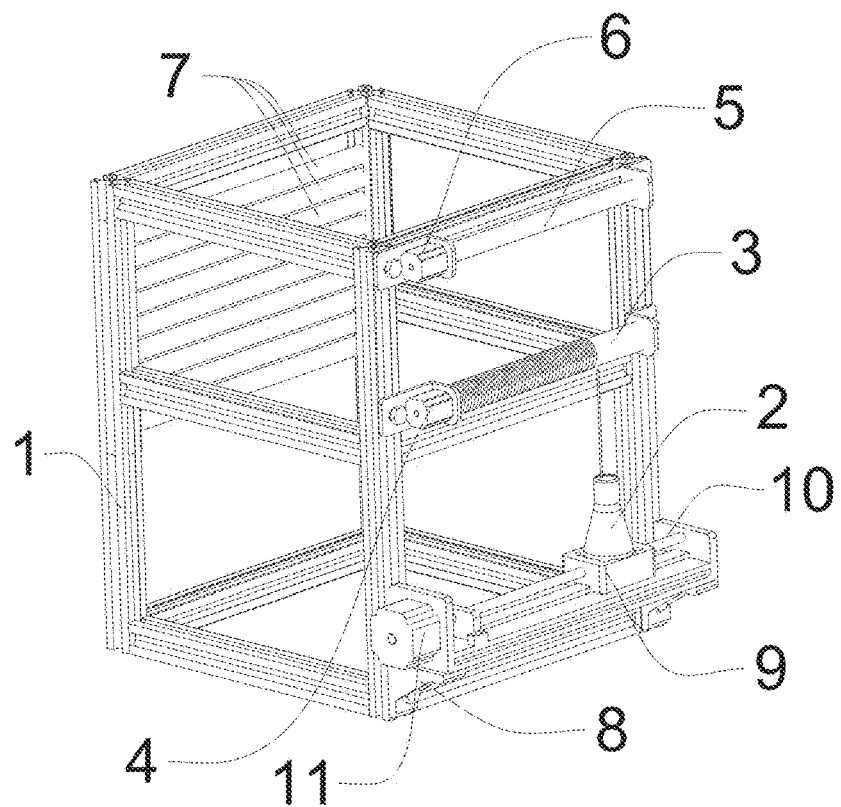
FIG. 11 is a schematic structural view of an apparatus for preparing a monodomain liquid crystal elastomer smart fiber according to the present invention.
Figure 12:
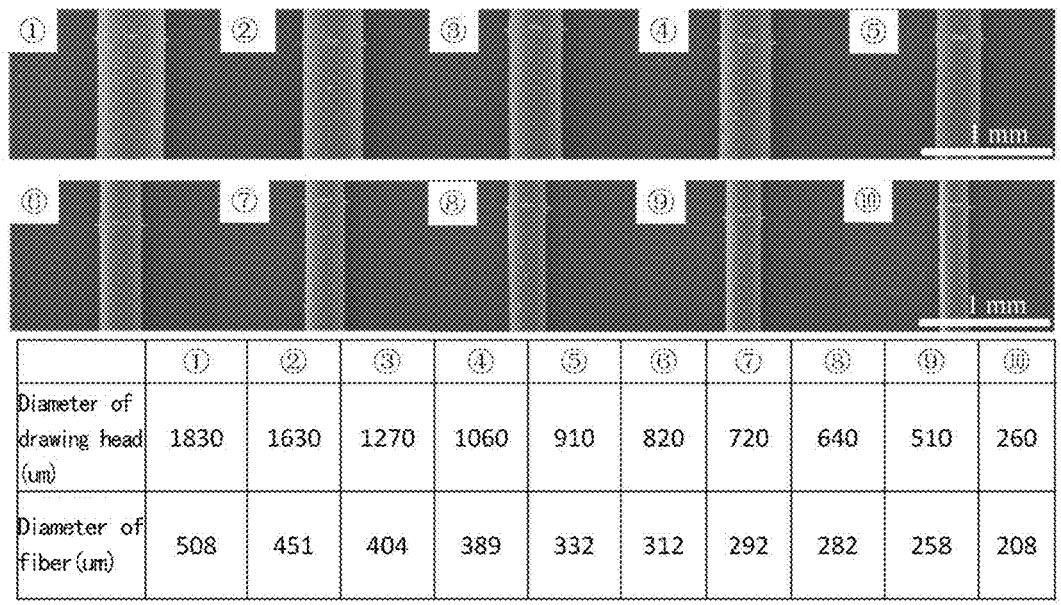
FIG. 12 is an SEM image of the monodomain liquid crystal elastomer smart fibers with different diameters prepared by using the apparatus for preparing monodomain liquid crystal elastomer smart fiber according to the present invention.
Figure 13:
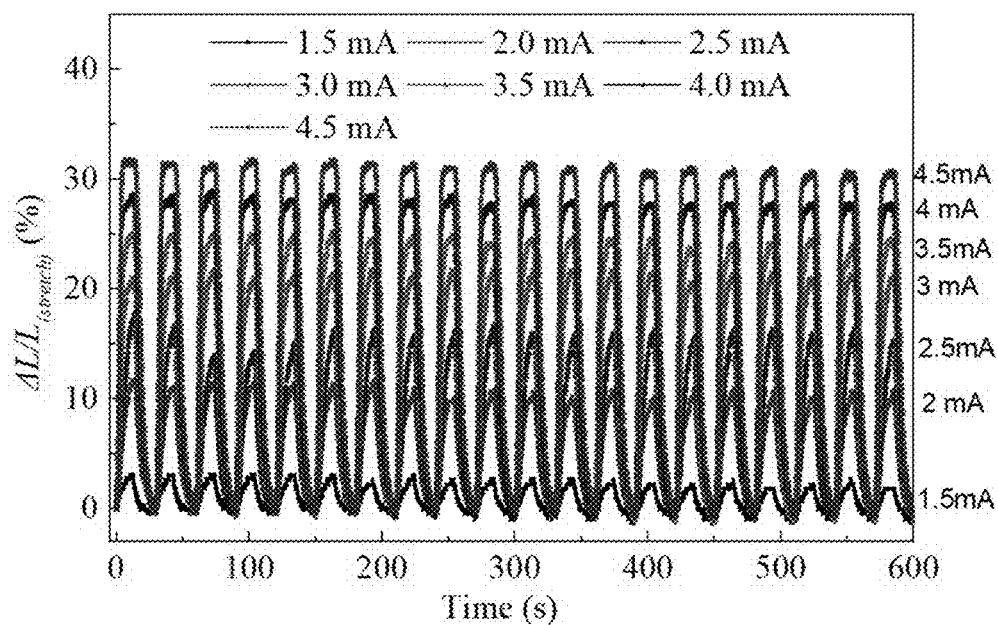
FIG. 13 is a diagram of the contraction cycle of an electro-bionic tendon prepared according to the present invention under different constant current drives at a load of 1 MPa.

The apparatus for preparing the monodomain liquid crystal elastomer smart fiber according to the present invention will be further described in conjunction with FIGS. 11-12, but is not limited thereto.

As shown in FIG. 11, the apparatus for preparing a monodomain liquid crystal elastomer smart fiber comprises:

a main frame 1;

a translation mechanism including a screw drive assembly, the screw drive assembly being installed on the main frame 1 for driving a sample tank 2 to translate in the horizontal direction, specifically, the translation mechanism includes a base 8 fixed on the main frame 1, a screw rod 10 fixed on the base 8 through mounting seats at both ends and arranged in parallel with a drawing drum 3, a slider 9 installed on the screw rod 10 and provided with a holder for fixing the sample tank 2 and moving with the slider 9, and a first motor 11 drivingly connected to the screw rod 10 and configured to output power to drive the slider 9 to move laterally through transmission of the screw rod 10.

a drawing mechanism including the drawing drum 3 fixed on the main frame 1 through mounting seats on both sides and arranged above the translation path of the sample tank 2, and a second motor 4 to drive the drawing drum 3 to rotate, wherein the nascent fibers drawn by a drawing head are fixed on the drawing drum 3 which rotates to wind the drawn fibers on the surface thereof;

a collection mechanism including a collection drum 5 also fixed on the main frame 1 through mounting seats on both sides and arranged immediately above the drawing drum 3, and a third motor 6 to drive the collection drum 5 to rotate, wherein the collection drum 5 rotates to wind the fibers unwound from the drawing drum 3 with tension; and an infrared heating mechanism including a plurality of infrared lamps 7 installed in parallel on the main frame 1 and located on the side of the main frame 1 away from the drawing drum 3, wherein the infrared lamps 7 are arranged to irradiate and heat the fiber to volatilize the solvent in the fiber for solidification.

Next, the specific use of the preparation apparatus according to the present invention is described. First of all, the infrared lamps 7 are energized, and then the sample tank 2 with the solution is fixed on the top of the slider 9 through the holder. The metal cylindrical drawing head is placed into the solution to draw nascent fibers, and the nascent fibers are wound and fixed on the drawing drum 3. Then the first motor 11 and the second motor 4 are turned on, wherein the second motor 4 drives the rotation of the drawing drum 3 to wind the fibers on its surface, and the first motor 11 moves the sample tank 2 so that the fibers can be wound along the length of the drawing drum 3. The fibers are cured on the surface of the drawing drum 3 under the irradiation and heating of the infrared lamps 7. The fibers are placed in air at room temperature for 48 hours to remove excess solvent in the fibers, and then the third motor 6 is turn on to stretch the fibers again and collect them on the collection drum 5. When the fiber is released from the drawing drum 3, a certain tension is maintained so that the fiber can be stretched and deformed, wherein in the stretching rate is 80%. After placement for 4 days, a roll of high-strength mono-domain liquid crystal elastomer smart fiber can be obtained.

More specifically, the diameter of the drawing drum is 2-10 cm, and the drawing speed is 0.5-5 cm/s.

More specifically, the drawing head is a metal cylindrical drawing head with an outer diameter of 0.25-1.83 mm and a drawing speed of 0.5-5 cm/s. FIG. 12 illustrates the SEM of the fibers drawn by drawing heads of different diameters, indicating the thicker the drawing head, the thicker the fiber drawn.

As a preference of the above embodiment, the plurality of infrared lamps 7 is divided into three groups that are arranged in order from top to bottom, wherein the bottom group of infrared lamps 7 is parallel to the drawing drum 3, the remaining two groups of infrared lamps 7 are respectively installed at a height between the drawing drum 3 and the collection drum 5, and wherein the set power of each group of the infrared lamps 7 gradually increases as the height increases. Each group of infrared lamps 7 comprises three infrared lamps 7 of the same power. The power of the bottom group of infrared lamps 7 is 50 W, providing a constant temperature of 30-35° C., the power of the intermediate group of infrared lamps 7 is 100 W, providing a constant temperature of 35-40° C., and the power of the top group of infrared lamps 7 is 120 W, providing a constant temperature of 40-45° C.

Regarding the setting of the power of the infrared lamps 7, it is necessary to consider the curing temperature of the fiber and the content of the solvent. Specifically, when tetrahydrofuran is used as the solvent, since the boiling point of tetrahydrofuran is 66° C., the solvent content in the early stage of drawing is relatively high, and the excessively high temperature will cause the formation of bubbles or holes in the fiber, which will destroy the uniformity of the fiber. Therefore, the group of infrared lamps 7 closest to the drawing drum 3 has a minimum power of 50 W and provides a constant temperature of 30-35° C.

Those skilled in the industry should understand that the present invention is not limited by the foregoing embodiments. The foregoing embodiments and descriptions only illustrate the principles of the present invention. Without departing from the spirit and scope of the present invention, the present invention will have various changes and improvements, which fall within the scope of the claimed invention. The scope of protection claimed by the present invention is defined by the appended claims and their equivalents.

The invention claimed is:

1. A method for preparing a monodomain liquid crystal elastomer smart fiber, comprising: during crosslinking process of the liquid crystal elastomer, drawing of liquid crystal elastomer fibers with uniform diameter from a polymer solution when a viscosity of the cross-linked polymer solution increases to a point where filaments are drawn; heating by an infrared lamp to form filamentous liquid crystal elastomer fiber; natural air drying to remove excess solvent in the fiber; and stretching and collection of the fiber; followed by placement of the fiber, whereby the monodomain liquid crystal elastomer smart fiber is obtained, wherein the method comprises the following operation steps:

S1: adding a liquid crystal monomer and a chain extender to a solvent, stirring and mixing the same evenly, adding a catalyst and stirring airtightly until a reaction ends, whereby a prepolymer is obtained;

S2: adding a crosslinking agent to the prepolymer obtained in step S1, mixing and stirring the same evenly, adding the catalyst again, and continuing airtight stirring to obtain a polymer solution;

S3: when the viscosity of the polymer solution obtained in step S2 increases to the point where filaments are drawn, drawing liquid crystal elastomer fibers with uniform diameter from the polymer solution, heating the fibers by irradiation with an infrared lamp, followed by continuous rotation, whereby filamentary liquid crystal elastomer fibers are continuously prepared;

S4: drying the prepared liquid crystal elastomer fibers by natural air to remove the excess solvent in the fibers, and then stretching and collecting the fibers, wherein the stretching rate is 50-90%, followed by a placement after which the monodomain liquid crystal elastomer smart fiber is obtained, wherein the chain extender is one or more of ethylene glycol bis(3-mercaptopropionate) (GDMP), 1,4 butanediol bis(mercaptopropionate) (BDBT), ethylene glycol dimercaptoacetate (EGBMA), 3,6-dioxa-1,8-octanedithiol (EDDET), bis(2-mercaptoethyl)ether (DSH), 1,3-propanedithiol (PDT), 1,6-Hexanedithiol (HDT) and 1,10-decanedithiol (DDT), and wherein the crosslinker is pentaerythritol tetrakis (3-mercaptopropionate) (PETMP).

2. The method for preparing a monodomain liquid crystal elastomer smart fiber according to claim 1, further comprising the following steps:

S1.1: prior to S2, adding a conductive filler to the prepolymer obtained in step S1, stirring the same airtightly until even mixing is achieved, followed by ultrasonic dispersion.

3. The method for preparing a monodomain liquid crystal elastomer smart fiber according to claim 1, wherein the molar ratio of the liquid crystal monomer to the chain extender is 1:0.8-0.95.

4. The method for preparing a monodomain liquid crystal elastomer smart fiber according to claim 1, wherein the catalyst is one of di-n-propylamine (DPA) and triethylamine (TEA).

5. The method for preparing a monodomain liquid crystal elastomer smart fiber according to claim 1, wherein a molar ratio of the liquid crystal monomer to the crosslinker is 1:0.025-0.1.

6. The method for preparing a monodomain liquid crystal elastomer smart fiber according to claim 2, wherein the conductive filler is one or more of carbon nanotubes, carbon black, and graphene.

7. An apparatus for preparing a monodomain liquid crystal elastomer smart fiber, comprising:

a main frame;

a translation mechanism including a screw drive assembly, the screw drive assembly being installed on the main frame for driving a sample tank to translate in a horizontal direction;

a drawing mechanism including a drawing drum fixed on the main frame through mounting seats on both sides and arranged above a translation path of the sample tank, and a second motor to drive the drawing drum to rotate, wherein nascent fibers drawn by a drawing head are fixed on the drawing drum which rotates to wind the drawn fibers on a surface thereof;

a collection mechanism including a collection drum also fixed on the main frame through mounting seats on both sides and arranged immediately above the drawing drum, and a third motor to drive the collection drum to rotate, wherein the collection drum rotates to wind the fibers unwound from the drawing drum with tension; and an infrared heating mechanism including a plurality of infrared lamps installed in parallel on the main frame and located on the side of the main frame away from the drawing drum, wherein the infrared lamps are arranged to irradiate and heat the fiber to volatilize a solvent in the fiber for solidification.

8. The apparatus for preparing a monodomain liquid crystal elastomer smart fiber according to claim 7, wherein the plurality of said infrared lamps is divided into three groups that are arranged in order from top to bottom, wherein the bottom group of infrared lamps is parallel to the drawing drum, the remaining two groups of infrared lamps are respectively installed at a height between the drawing drum and the collection drum, and wherein a set power of each group of the infrared lamps increases as the height increases.

* * * * *